United States Patent [19]

Atmur et al.

[11] Patent Number: 5,738,818
[45] Date of Patent: Apr. 14, 1998

[54] COMPRESSION/INJECTION MOLDING OF POLYMER-DERIVED FIBER REINFORCED CERAMIC MATRIX COMPOSITE MATERIALS

[75] Inventors: Steven Donald Atmur, Riverside; Thomas Edward Strasser, Corona, both of Calif.

[73] Assignee: Northrop Grumman Corporation, Los Angeles, Calif.

[21] Appl. No.: 704,348

[22] Filed: Aug. 28, 1996

[51] Int. Cl.$^6$ .................. C04B 33/32; C04B 35/80
[52] U.S. Cl. .................. 264/624; 264/625; 264/626; 264/628; 264/640; 264/641; 264/645; 264/328.2; 264/328.12; 264/328.18
[58] Field of Search .................. 264/60, 328.2, 264/328.12, 328.18, 624, 625, 626, 628, 640, 641, 645

[56] References Cited

U.S. PATENT DOCUMENTS

| | | |
|---|---|---|
| 4,294,788 | 10/1981 | Laskow et al. |
| 4,749,631 | 6/1988 | Haluska et al. |
| 4,759,977 | 7/1988 | Fukuda et al. |
| 4,837,230 | 6/1989 | Chen .................. 264/60 |
| 4,983,463 | 1/1991 | Minford et al. |
| 5,023,041 | 6/1991 | Jones .................. 264/328.4 |
| 5,122,226 | 6/1992 | Minford et al. |
| 5,162,136 | 11/1992 | Blum et al. |
| 5,179,048 | 1/1993 | Niebylski et al. |
| 5,190,709 | 3/1993 | Lukacs .................. 264/63 |
| 5,196,120 | 3/1993 | White. |
| 5,198,152 | 3/1993 | Liimatta et al. |
| 5,227,113 | 7/1993 | Hamabe et al. |
| 5,238,627 | 8/1993 | Matsuhisa .................. 264/328.2 |
| 5,360,662 | 11/1994 | Wong. |
| 5,393,822 | 2/1995 | Marumoto et al. |
| 5,394,930 | 3/1995 | Kennerknecht. |
| 5,411,763 | 5/1995 | Weaver et al. |
| 5,436,042 | 7/1995 | Lau et al. |
| 5,445,894 | 8/1995 | Haluska et al. |

*Primary Examiner*—James Derrington
*Attorney, Agent, or Firm*—Terry J. Anderson; Karl J. Hoch, Jr.

[57] ABSTRACT

Methods of making fiber reinforced ceramic matrix composite (FRCMC) parts by compression and injection molding. The compression molding method generally includes the initial steps of placing a quantity of bulk molding compound into a female die of a mold, and pressing a male die of the mold onto the female die so as to displace the bulk molding compound throughout a cavity formed between the female and male dies, so as to form the part. The injection molding method general includes an initial step of injecting a quantity of bulk molding compound into a cavity of a mold. In both methods, the bulk molding compound is a mixture which includes pre-ceramic resin, fibers, and, if desired, filler materials. Once the part has been formed by either method, the mold is heated at a temperature and for a time associated with the pre-ceramic resin which polymerizes the resin to form a fiber-reinforced polymer composite structure. The part is then removed from the mold, and heated a second time at a temperature and for a time associated with the polymerized resin which pyrolyzes it to form the finished FRCMC structure. These methods can also be modified to allow for the molding of heterogeneous FRCMC parts wherein different portions of the part contain different types of fiber and, if desired, different filler materials, so as to vary the characteristics exhibited by each portion thereof.

24 Claims, 4 Drawing Sheets

COMPRESSION/INJECTION MOLDING OF POLYMER-DERIVED FIBER REINFORCED CERAMIC MATRIX COMPOSITE MATERIALS

BACKGROUND

1. Technical Field

This invention relates to methods of forming structural and mechanical parts from fiber-reinforced ceramic matrix composite (FRCMC) materials, and more particularly, to the compression and injection molding of these parts.

2. Background Art

Composite material structures are very popular for various uses. Typically, these structures constitute a matrix of "cured" organic resins with some type of fiber dispersed throughout. More recently, fiber reinforced ceramic matrix composite (FRCMC) structures have been made available for use where due to high temperatures organic composites are not suitable. A typical FRCMC structure comprises fibers of various types and lengths disposed throughout a ceramic material formed from a pre-ceramic resin. While organic composites will burn readily, FRCMC, being a ceramic, withstands heats that can destroy even metals. For example, a FRCMC material can withstand continuous temperatures up to about 1000° F., cyclical temperatures up to about 2000° F., and short-term exposure to temperatures up to about 3500° F.

FRCMC structures are made by combining the aforementioned pre-ceramic polymer resin, such as silicon-carboxyl resin sold by Allied Signal under the trademark BLACKGLAS or alumina silicate resin (commercially available through Applied Poleramics under the product description CO2), with fibers. Examples of types of fibers which might be employed include alumina, Altex, Nextel 312, Nextel 440, Nextel 510, Nextel 550, silicon nitride, silicon carbide, HPZ, graphite, carbon, or peat. These fibers can be supplied in rigid or binderized preforms, woven or braided preforms, random mat preforms, fabric, tow (thread), or chopped tow or fabric. The resin-fiber mixture is formed into the shape of the desired structure and heated for a time to a temperature, as specified by the material suppliers (typically between 1,500° F. and 2,000° F.), which causes the resin to convert into a ceramic material.

There are many methods which can be used to form the FRCMC structures. For example, a resin transfer molding (RTM) process is described in a co-pending application entitled METHODS AND APPARATUS FOR MAKING CERAMIC MATRIX COMPOSITE LINED AUTOMOBILE PARTS AND FIBER REINFORCED CERAMIC MATRIX COMPOSITE AUTOMOBILE PARTS by the inventors herein and assigned to the common assignee of the present application. This co-pending application was filed on Aug. 16, 1995 and assigned Ser. No. 08/515,849 now U.S. Pat. No. 5,632,320. The RTM method described in the co-pending application generally involves forming a preform in the shape of the part from the aforementioned fibers; placing the preform in a cavity of a mold having the shape of the part; forcing a liquid pre-ceramic polymer resin through the cavity to fill the cavity and saturate the preform; heating the mold at a temperature and for a time associated with the pre-ceramic polymer resin which transforms the liquid pre-ceramic polymer resin-saturated preform into a polymer composite part; removing the polymer composite part from the mold; and, firing the polymer composite part in a controlled atmosphere at a temperature and for a time associated with the pre-ceramic polymer which transforms it into a ceramic, whereby the polymer composite part is transformed into a fiber reinforced ceramic matrix composite part.

The RTM method of forming FRCMC structures works well for its intended purpose. However, this method requires the use of a fiber preform which must be placed in the mold prior to the structure being formed. These preforms add to the expense of producing the FRCMC structure, not only due to the cost of the preform itself, but also because of the extra processing steps required to install the preform into the mold.

Accordingly, there is a need for a method of making FRCMC parts that is conducive to mass producing these parts at a faster pace and at a reduced cost in comparison to other methods, such as RTM processes.

Wherefore, it is an object of the present invention to provide such a method of making FRCMC parts via a compression molding process wherein instead of having to employ fiber preforms such as with a RTM process, chopped fibers are mixed with a pre-ceramic resin prior to placing the mixture into a compression mold.

Wherefore, it is another object of the present invention to provide such a method of making FRCMC parts via an injection molding process wherein instead of having to employ fiber preforms such as with a RTM process, chopped fibers are mixed with a pre-ceramic resin prior to being injected into an injection mold.

It is also an object of the present invention to provide such a method of making FRCMC parts having heterogeneous structures wherein various portions of the part included different fiber types and potentially different filler materials which impart characteristics desired to be exhibited by a particular portion of the part.

SUMMARY

The above-described objectives are realized with embodiments of the present invention directed to methods of making fiber reinforced ceramic matrix composite (FRCMC) parts by compression and injection molding. The compression molding methods generally include the steps of:

(a) Placing a quantity of bulk molding compound into a female die of a mold. The bulk molding compound is a mixture which includes pre-ceramic resin and fibers.

(b) Pressing a male die of the mold onto the female die so as to displace the bulk molding compound throughout a cavity formed between the female and male dies. The walls of the cavity form the exterior surfaces of the FRCMC part being molded.

(c) Heating the mold at a temperature and for a time associated with the pre-ceramic resin which polymerizes the resin to form a fiber-reinforced polymer composite structure.

(d) Removing the polymerized composite structure from the mold.

(e) And, heating the polymerized composite structure at a temperature and for a time associated with the polymerized resin which pyrolyzes it to form a FRCMC structure.

Whereas, the injection molding methods generally include the steps of:

(a) Injecting a quantity of bulk molding compound into a cavity of a mold. Here too, the bulk molding compound is a mixture which includes pre-ceramic resin and fibers, and the cavity walls form the exterior surfaces of the FRCMC part being molded.

(c) Heating the mold at a temperature and for a time associated with the pre-ceramic resin which polymerizes the resin to form a fiber-reinforced polymer composite structure.

(d) Removing the polymerized composite structure from the mold.

(e) And, heating the polymerized composite structure at a temperature and for a time associated with the polymerized resin which pyrolyzes it to form a FRCMC structure.

In either of these molding methods, it is preferred that the bulk molding compound specifically include a quantity of fibers which corresponds to the maximum percent by volume of fibers capable of being dispersed throughout the FRCMC part. This maximum is between about 15 and 50 percent (and possibly more) dependent on the length of the fibers employed, the shape of the part being molded, and the quantity of filler material (if any) that is added to the compound. In addition, the mold preferably has one or more resin outlet ports connecting the cavity of the mold to its exterior. These outlet ports are used to allow any excess resin exceeding that required to form the part to be expelled. Each resin outlet port has a cross-sectional area small enough to substantially ensure the fibers cannot flow through the port, yet large enough to allow the flow of resin therethrough. The bulk molding compound will preferably have such excess amounts of resin to ensure the fibers flow with the resin within the cavity of the mold at its prescribed viscosity. The prescribed viscosity of the pre-ceramic resin is chosen such that it is high enough to ensure the aforementioned fiber flow, but low enough to ensure the resin readily flows through the fibers once packed into position, with any excess flowing out of the outlet ports. It is noted that a greater viscosity is required for longer fibers. For a selected part, preferably the fibers are approximately the same length. Fiber lengths can range from about 0.125 inch to 12 inches in length. For fibers within the preferred range, the prescribed viscosity of the pre-ceramic resin will preferably range between 5000 and 30,000 centipoise, depending on the length of the fibers. As alluded to above, the bulk molding compound may also include a quantity of filler material which corresponds to the percent by volume of filler material desired to be dispersed throughout the finished FRCMC part.

Once the FRCMC part is molded via either the compression or injection molding processes of the present invention, it is preferred that an additional procedure be performed to eliminate pores created during the required heating cycles. Eliminating these pores strengthens the part. Specifically, after the completion of the heating step which pyrolyzes the FRCMC part, the part is immersed into a bath of a preceramic resin to fill the pores. The part is then heated at a temperature and for a time associated with the resin filling said pores so as to transform it to a ceramic material. Unfortunately, the process of heating the resin filling the pores will create further pores. Accordingly, it is desired that the filling and heating steps be repeated until the pore density within the FRCMC part is less than a prescribed percentage by volume. This prescribed percentage corresponds to the point where the part will exhibit a repeatable strength from one part to the next. It is believed five iterations of the filling and firing process are required to obtain this repeatable part strength. To facilitate the filling step, it is preferred that the resin has a water-like viscosity. In addition, the FRCMC part could be placed in a vacuum environment to assist in the filling of the pores.

The compression and injection molding processes of the present invention are capable of producing a FRCMC part having a homogeneous structure where the percentages of resin, fiber and filler (if present) will be substantially the same throughout the molded part. However, these processes can be modified to produce parts having a heterogeneous structure where the types and percentages of the components making up the composite vary from section to section in order to impart a varying set of characteristics (i.e. physical, electrical, etc.). This can be accomplished in an embodiment of the compression molding process of the present invention by employing a layering process. The layering involves placing a sheet of fiber cloth on top of the quantity of bulk molding compound placed into a female die of a mold prior to closing the mold. Fiber cloth is a material typically made up of long intermingled or woven fibers. When the mold is closed, the resin from the bulk molding compound will flow into the sheet of fiber cloth. Thus, once the resin is pyrolyzed, the resulting part will have one layer exhibiting characteristics imparted by the fiber cloth and one layer exhibiting characteristics imparted by the fibers (and possibly fillers) present in the bulk molding compound, all integrated by the ceramic matrix material present throughout the structure. If the fiber cloth is dense, as is usually the case, it will form a barrier to the fibers and filler materials (if any) present in the bulk molding compound, thereby keeping most of them in the bulk molding compound layer. However, this same density can prevent a complete saturation of the fiber cloth sheet by the resin and cause unwanted voids in the completed FRCMC part. Accordingly, it is preferred that the fiber cloth sheet be saturated with pre-ceramic resin prior to being placed in the mold. An additional layer can also be formed by adding another quantity of bulk molding compound on top of the fiber cloth before closing the mold. If desired even more layers can be incorporated by placing additional alternating layers of fiber cloth and bulk molding compound in the mold.

The injection molding process of the present invention can also be modified to create a heterogeneous FRCMC structure. This is accomplished by the use of multiple charges of bulk molding compound where each charge contains the fibers and filler materials (if used) which will impart the desired characteristics to a portion of the finished part. Specifically, a separate charge of bulk molding compound is used to form each portion of the part that is to have differing characteristics from an adjacent portion. This is done by sequentially injecting separate charges of bulk molding compound into a cavity of a mold until said cavity is completely packed with fibers. Each charge includes the quantity of fibers which corresponds to the maximum percent by volume of fibers capable of being dispersed within the portion of the FRCMC part associated with the particular charge. Each charge may also include the quantity of filler materials desired to be present in the portion of the part associated with the charge. Further, it is important that excess resin, over that required to fill the space in the portion associated with the charge which is not filled with fibers or filler materials, be included in each charge. Specifically, them should be at least enough excess resin to fill the portion of the cavity behind the target portion associated with the charge.

The above-described sequential injection of the various charges of bulk molding compound is done as follows. The first charge is injected into the mold. This will result in some portion of the fibers and filler materials (if present) associated with that charge being packed into the target portion of the part, which in this case will be in the region of the mold cavity furthest from the sprue channel(s) of the mold. Once this first charge is fully injected, the region of the mold cavity behind the first target portion will be filled with the remaining resin of the charge, as well as any yet to be packed fibers and filler materials. The second charge is then injected into the mold. This charge will first push the remaining resin, fibers, and filler materials of the first charge into the first target portion, thereby packing the remaining fibers and filler materials and forcing the excess resin out of the resin outlet ports. The fibers and filler materials (if any) present in the second charge will then pack into place in the second target portion behind the packed fibers and filler materials in the first portion. This process is repeated, if there are to be more than two portions, until all the charges have been injected. It is noted that the last charge will result in the remaining region of the mold cavity adjacent the sprue channels being packed with fibers and filler materials, thus completing the molding of the FRCMC part.

The injection molding process of the present invention which forms a heterogeneous FRCMC structure can be further facilitated by employing a "timed exit" approach. This approach entails incorporating one or more additional sets of resin outlet ports. Each one of these additional resin outlet port sets is disposed at a different location in the cavity of the mold between the first set (which is at the end of the cavity furthest from the sprue channel(s)) and sprue channel (s). Specifically, these locations corresponding to the end of each of the aforementioned portions of the FRCMC part which is furthest from the sprue channel(s). During the sequential injection process, only the first resin outlet port set is open, while the ports of all the other sets are closed. At the point where all the fibers and filler materials (if any) associated with the first charge are packed into the first portion of the part, the set of ports adjacent the end of the second portion are opened. This facilitates the flow of excess resin out of the mold and speeds up the packing process in the second portion. It also minimizes any infiltration of fibers and filler materials from the second charge into the first portion of the part. As additional charges are injected into the mold, the resin outlet ports associated with the portion of the part being formed with that charge, are opened. In addition, it is preferable that the ports associated with a completed portion of the part be closed when the ports associated with an adjacent portion are opened, to further minimize the aforementioned infiltration.

The "timed exit" approach can also be used to facilitate the injection molding of extremely long homogeneous FRCMC parts. An additional set, or sets, of resin outlet ports are incorporated into the mold between the first set (most remote from the sprue channel(s)) and the sprue channel(s). The process is essentially the same as described for producing heterogeneous parts, except that there is only one charge injected, and the various sets of ports are opened whenever fibers and filler materials (if any) pack to a point just ahead of a closed set.

In addition to the just described benefits, other objectives and advantages of the present invention will become apparent from the detailed description which follows hereinafter when taken in conjunction with the drawing figures which accompany it.

BRIEF DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

The present invention involves two related methods of producing a variety of structural and mechanical parts molded from polymer-derived fiber reinforced ceramic matrix composite (FRCMC) materials. Specifically, these parts are made by compression or injection molding.

Figure 1:
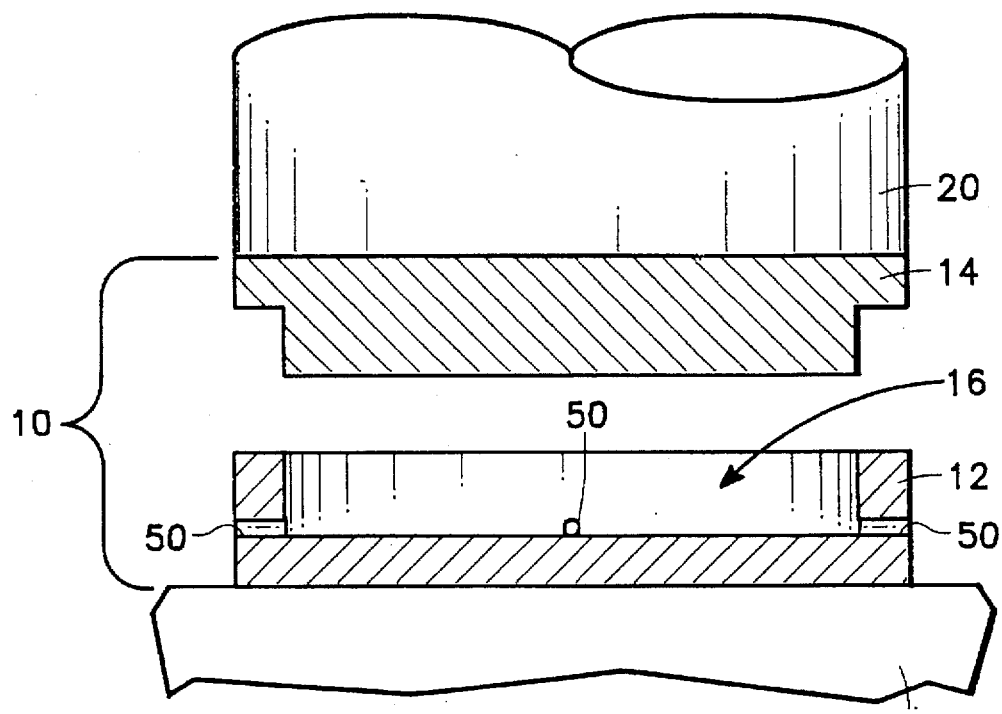
FIG. 1 is a partially cross-sectional view of an apparatus capable of performing compression molding of fiber-reinforced ceramic matrix composite (FRCMC) parts in accordance with the methods of the present invention.
Figure 2:
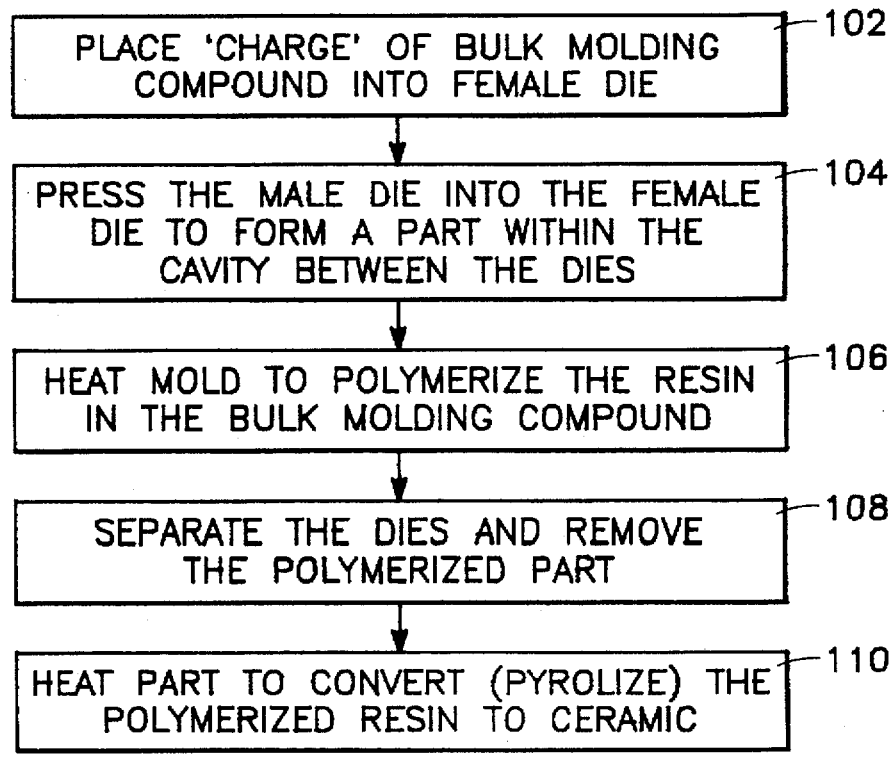
FIG. 2 is a block diagram of a method for the compression molding of FRCMC parts in accordance with the methods of the present invention using the apparatus of FIG. 1.

FIG. 1 is a simplified depiction of an embodiment exemplifying the portion of the present invention corresponding to the compression molding of polymer-derived FRCMC parts. Generally, a quantity of a bulk molding compound called a "charge" is placed into a compression mold 10. This compound is a mixture of unpolymerized pre-ceramic resin, chopped fibers, and possible other powderized filler materials. The compression mold 10 has a female die 12 and male die 14 which when placed together form a cavity 16 in-between. The walls of the cavity 16 form the surfaces of the part being molded when it is filled with the aforementioned compound. In one preferred version of the compression molding process, the female die 12 is attached to the bed 18 of a conventional press, while the male die 14 is attached to the ram 20 of the press. The two dies 12, 14 are held in alignment with each other by the bed 18 and the ram 20 such that when the press is activated the dies come together and form the previously-described internal cavity 16. As depicted in FIG. 2, the first step 102 in producing a compression molded part entails placing a charge of the bulk molding compound in the female die while the two dies are separated from each other. The male die is then pressed down onto the female die to form the part being molded in the cavity (step 104). Once the molded part is formed, the FRCMC material is heated in the mold (step 106) to a level and for a time sufficient to polymerize the resin, as suggested by the manufacturer of the resin. The result is a part similar to bisque-ware in ceramics such that it does not have its full strength as yet, but can be handled. The dies are then separated and the polymerized part is removed from the mold (step 108).

Figure 3:
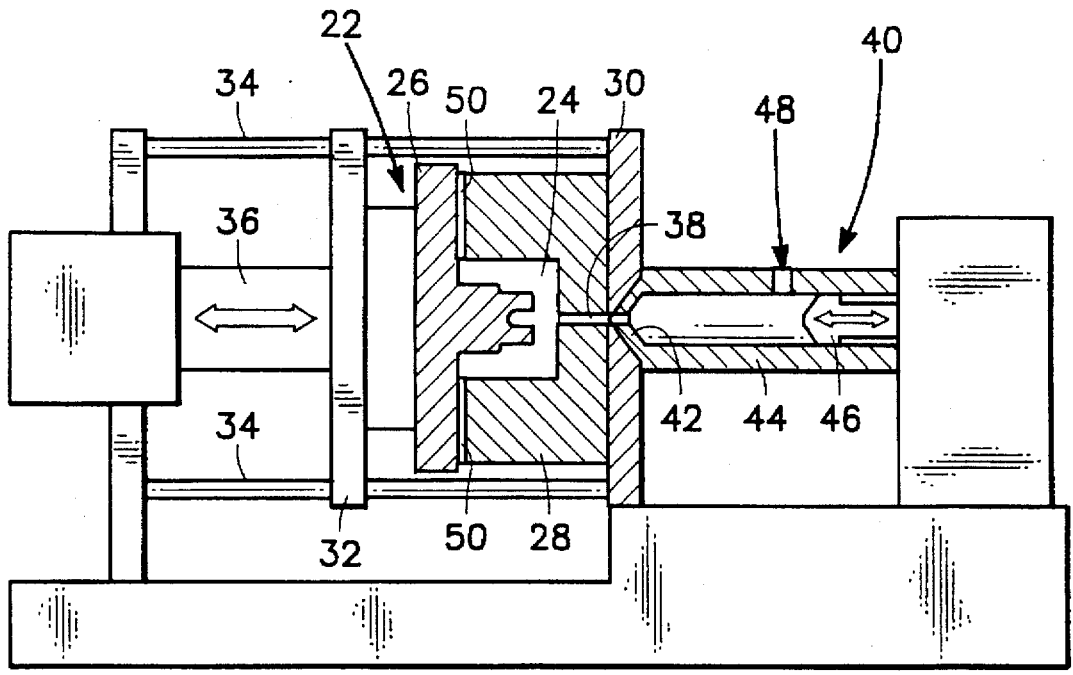
FIG. 3 is a partially cross-sectional view of an apparatus capable of performing injection molding of FRCMC parts in accordance with the methods of the present invention.
Figure 4:
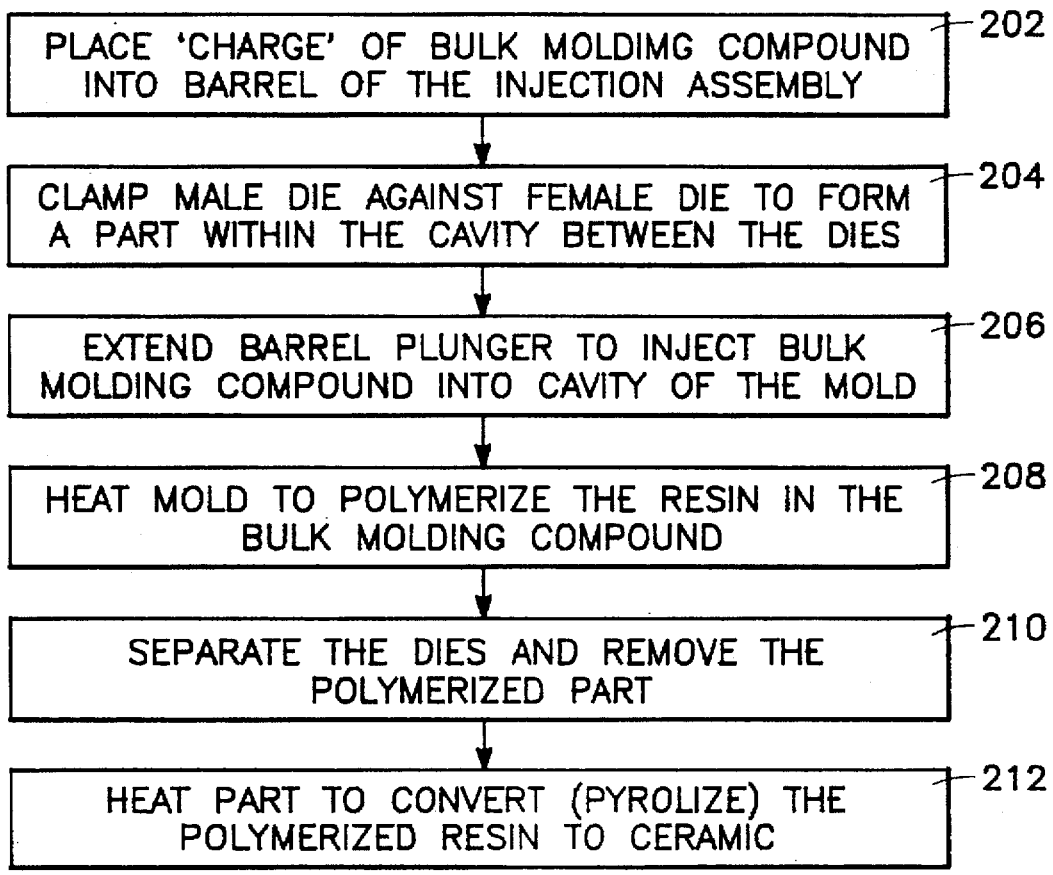
FIG. 4 is a block diagram of a method for the injection molding of FRCMC parts in accordance with the methods of the present invention using the apparatus of FIG. 3.

FIG. 3 is a simplified depiction of an embodiment exemplifying the portion of the present invention corresponding to the injection molding of polymer-derived FRCMC parts. In this embodiment the charge of the aforementioned mixture of pre-ceramic resin, chopped fibers, and filler material (if used) is injected into a mold 22, which in the illustrated case forms a piston within its cavity 24. The mold 22 shown is a simplified two piece unit having a male die 26 which forms the interior surface of the piston, and a female die 28 which forms the exterior surface of the piston. The female die 28 is attached to a fixed platen 30, while the male die 26 is attached to a movable platen 32. The movable platen 32 can be translated along a set of tie bars 34 by a piston 36. The piston 36 retracts to open the mold 22 to facilitate removal of a formed part, and extends to clamp the mold 22 closed so that the bulk molding compound can be injected into the internal cavity 24 of the mold. The male and female dies 26, 28 are held in alignment with each other by the platens 30, 32 such that when they are clamped together by extension of the piston 36, the dies form the previously-described internal cavity 24. The female die 28 includes a sprue channel 38 which connects the back side of the die to the cavity 24. The bulk molding compound is injected into the cavity 24 through this sprue channel 38 from a plunger-operated injection assembly 40. The injection assembly 40 has an injection tip 42 which interfaces with a passageway through the fixed platen 30. An opening in the end of the injection tip 42 aligns with the sprue channel 38. The injection assembly 40 also has a hollow barrel 44 which is connected to the injection tip 42. An extendible and retractable plunger 46 is disposed within the barrel 44 to inject the bulk molding compound into the mold 22. The compound is loaded into the barrel 44 through an inlet 48. As illustrated in FIG. 4, the first step 202 in producing an injected molded part entails placing a charge of the bulk molding compound in the barrel of the injection assembly via the inlet. This is done when the plunger is fully retracted. The male die is then clamped against the female die by extending the piston attached to the male die (step 204). Enough force is exerted on the dies by the piston so as to prevent the dies from separating under the pressure of the bulk molding compound when it is injected into the mold cavity. The barrel inlet is then sealed, and the plunger extended to force the bulk molding compound through the injection tip and the adjacent sprue channel, and into the cavity of the mold (step 206). This molds the part which in the illustrated case is a piston. Once the molded part is formed, the FRCMC material is heated in the mold (step 208) to a level and for a time sufficient to polymerize the resin, as suggested by the manufacturer of the resin. The piston is then retracted to separate the dies and the polymerized part is then removed from the mold (step 210).

In either the above-described compression molding or the injection molding process, the polymerized part must be heated a second time so as to pyrolyze the polymerized resin (step 110 in FIG. 2 and step 212 in FIG. 4). The manufacturer's recommended procedures should be followed in regards to the heating cycles and any special environmental conditions that must be observed.

The pyrolization process which turns the polymer to ceramic causes the formation of pores during the heating cycles. The resultant ceramic part is about 70% solid and 30% pores. To substantially eliminate these pores and thereby strengthen the part, the formed part is immersed in liquid pre-ceramic resin. A vacuum infiltration process may also be used for this step. In addition, the resin preferably has a very low, almost water-like, viscosity (e.g. 1–10 centipoise) so that it readily fills the pores in the part. The part is then heated once again for the time and at the temperature indicated by the manufacturer of the resin via the above described process in order to pyrolyze the resin, thus filling the pores. However, once again the pyrolization process will cause to formation of more pores in the previously filled pores (i.e. approximately 30%). Accordingly, the pore filling process is preferably repeated until pore removal has achieved a desired level. It has been found that after about five iterations of the pore filling process, the resultant part is about 95–98 percent solid and will exhibit repeatable high strengths. Accordingly, it is preferred that the process be repeated at least five times, or until a predetermined porosity is achieved.

A key advantage of parts made from FRCMC materials, over conventional monolithic ceramic parts, is the added strength and ductility afforded by the fibers. Generally, up to practical limits, the higher the percentage of fiber by volume in a FRCMC material, the greater its strength and ductility. Accordingly, it is desirable to maximize the volume percent of fiber. However, this presents a problem when forming FRCMC parts via compression or injection molding methods. Specifically, the fibers must be able to flow with the uncured pre-ceramic resin into every recess of the mold. Resin rich areas will not exhibit the desired strength and ductility. However, as the percentage of fiber increases in comparison to the percentage of resin in the bulk molding compound, the harder it is for the fibers to flow along with the resin. If the resin and fibers where mixed together in the exact quantities and proportions required to form the finished part with the desired high strength and ductility, it is possible that the fibers would bunch up in some parts of the mold and thus not flow with the resin to other parts. This would create undesirable resin-rich areas. One way to ameliorate the fiber flow problem is to increase the viscosity of the resin. A thicker resin will drag more fibers along than a thinner resin. However, increasing the viscosity of the resin will work only up to a point. For example, in the case of injection molding of fiber reinforced plastic composites, the resin is typically made thicker to move the fiber during the injection process. However, this method can achieve fiber-to-resin ratios of only about 5 or 6 percent, even when the resin is made extremely thick, i.e. on the order of 100,000 centipoise. Fiber percentages of 5 or 6 percent in a FRCMC material would not produce a molded part with the strength and ductility required for many applications. Rather, fiber percentages between about 15 to 50 percent by volume, or more, are preferred for most FRCMC applications. Not only is the fiber percentage produced by the "thick resin" method too low for FRCMC material applications, but injecting or compressing such a thick resin presents other problems as well. For instance, special heavy-duty molding equipment capable of producing the extremely high pressures required to move the resin must be employed. In addition, the molds have to be strong enough to withstand this high pressure.

The present invention avoids the above-described problems and produces FRCMC parts with the desired higher fiber percentages by taking a completely different approach. The present invention foregoes the conventional method of trying to load the desired fiber volume into the exact amount of resin required to form the part, and increasing the thickness of the resin in order to move the fiber along with the resin. Instead, the charge (referred to in step 102 of FIG. 2 and step 202 in FIG. 4) is prepared by combining the amount of fiber which when compressed or injected into the mold would provide the desired percentage by volume in the finished FRCMC part, with amounts of resin exceeding that required to form the part. As stated above, the higher the ratio of fibers to resin, the harder it is to get the fibers to flow with the resin. By increasing the amount of resin, the fiber-to-resin ratio is lowered, thereby making it easier for the fibers to flow with the resin. Accordingly, the resin does not have to be made excessively thick to flow the fibers into all parts of the mold. In order to remove the excess resin from the mold, a series of resin outlet ports 50 are incorporated. Examples of these ports 50 are shown in dashed lines in FIGS. 1 and 3. The ports 50 are preferably small enough such that the length of fiber used in the resin-fiber mixture does not easily pass through the ports, but large enough that the resin flows through readily. In addition, it is preferable that the resin outlet ports 50 are placed at points in the mold which are the furthest away from the point of contact of the charge and the male die in the case of compression molding, and the sprue channel in the case of injection molding, so that the fiber will tend to pack from theses remote locations back toward the male die or sprue channel as the case may be. As the resin-fiber mixture flows through the mold, the excess resin is ejected through the resin outlet ports 50, while at the same time the fibers pack within the mold. Once the mold is completely compressed, or all the resin-fiber mixture has been injected into the injection mold, what remains in the mold is the desired percentage of uniformly packed fibers and the remaining resin which has not been ejected. The above-described molding processes need not be wasteful in regard to the resin that is ejected from the mold. This material can be captured and reused in the next charge to form another part.

In essence, the above-described processes inherently produce the maximum fiber percentage possible. However, there are factors which will limit this maximum fiber percentage. The length of the fibers and the shape of the FRCMC part being formed will in part dictate the highest percent by volume of fiber which can be uniformly packed into the mold. For example, a complex part having sections with relatively thin walls, or curved sections having relatively extreme radii, will limit the maximum fiber percentage. This limitation stems from the tendency of the fibers to become trapped in thin wall and curved areas. As a result, the fibers begin to collect at these areas and limit the amount of fiber that flows with the resin past the thin wall or curved regions. Longer fibers further exacerbate this problem because they tend to become more easily trapped in the thin wall and curved areas. Therefore, FRCMC parts with these complex shapes will tend to exhibit lower maximum fiber percentages than parts having simpler structures. For example, complex parts having thin wall or sharply curved sections will exhibit fiber percentages closer to the 15 percent by volume. Whereas, FRCMC parts having simpler structures will exhibit fiber percentages closer the 50 or more percent by volume.

It is noted that the ports 50 depicted in FIGS. 1 and 3 are simplification of the actual resin outlet ports that would be employed in a mold. The exact number and location of the ports is a matter of mold design. However, the factors effecting mold design for the compression and injection molding processes according to the present invention are essentially the same as those effecting well known resin transfer molding (RTM) techniques employed in the molding of organic composite material. The molds employed in RTM also often require the use of resin outlet ports. Accordingly, one skilled in the art could readily design molds for use with the present invention by employing RTM methods. As these design considerations are known in the art, a detailed description of the mold design process will not be provided herein. However, a mold designer employing these well known mold design methods should also take into consideration the aforementioned preference that the resin outlet ports used with the present invention have a cross-sectional area which is small enough to prevent fibers of the length chosen for the bulk molding compound from exiting the mold cavity with the resin.

The "excess resin" methods according to the present invention have been found to produce FRCMC parts with up to about 50 percent fiber volumes. This level of fiber volume was accomplished in molding of a piston having relatively thick walls and gently curved sections. About twice as much pre-ceramic resin as is needed to form the part was used to flow fibers having a length of approximately 2.4 inches. The resin had a resin viscosity of about 8,000 to 12,000 centipoise. This resin viscosity is thick enough to drag the fibers along with the resin, but thin enough to squeeze past fibers that are packed into place within the mold on its way towards the resin outlet ports 50. It is anticipated that even higher fiber volumes may be possible using the methods of the present invention.

The viscosity of the pre-ceramic resin associated with the molding of the piston was for the most part dictated by the length of the fiber. It is believed that shorter fibers can be successfully moved through the mold with a less viscous resin. For example, it is believed a viscosity as low as about 5,000 centipoise could be employed with fibers having length of about 0.125 inches. Conversely, a thicker resin will be required to move longer fibers through the mold. For example, it is believed fibers up to about 12 inches in length can be successfully moved through a mold using a pre-ceramic resin having a viscosity of no more than about 30,000 centipoise.

Some FRCMC material applications require the addition of fillers into the resin-fiber matrix. These fillers are advantageously employed to tailor the mechanical, electrical, and other characteristics exhibited by a molded part. The addition of filler material also has been found to have process advantages in the context of compression and injection molding of FRCMC materials. Namely, the addition of filler materials tends to assist in the moving of the fibers through the mold. As such it has been found that the viscosity of the resin can be lowered even further, making the molding process quicker as the resin flows through the packed fibers more easily. For example, it has been found that the addition of about 10 percent by volume of 300 mesh silicon carbide particles into the bulk molding compound used to mold the aforementioned piston allowed the viscosity of the resin to be lowered to between about 3000–5000 centipoise. Filler particles are typically small (i.e. about 1–50 microns in diameter) and so flow readily through the mold with the resin and fibers. However, as the fibers begin to pack at the resin outlet ports, the filler particles tend to lodge within the tangle of packed fibers. The resin will continue to flow through the packed fibers and out the resin outlet ports, but most of the filler particles will be left behind. This process continues as the fibers pack back from the resin outlet ports resulting in a substantially uniform distribution of filler particles throughout the molded part. Thus, the finished FRCMC part will exhibit a uniform distribution of the filler particles in a volume percentage approximately matching that amount added to the original resin-fiber-filler mixture. It must be noted, however, that the addition of relatively large quantities of filler materials will lower the maximum fiber percentage possible in the molded part. Essentially, the filler materials will physically take up some of the space that could have been filled with fiber.

Given the above-described processes, it is preferred that each charge (i.e. the amount of resin-fiber-filler material required to form each FRCMC part including the excess resin) is preferably made to contain:

a) the amount of fiber which once distributed and packed in the mold will produce the desired percent volume of fiber. However, the desired percentage is limited by the length of the fiber and the complexity of the shape of the part being molded, as explained previously. In addition, the desired percentage of fiber may be limited by the amount of filler material added to the bulk molding compound;

b) the amount of filler material (if added) which once distributed and packed in the mold will produce the desired percent volume of filler; and c) the amount of resin which at a reasonable viscosity will facilitate the flow of fiber and filler material, but still readily pass around packed fibers and filler material.

Figure 5:
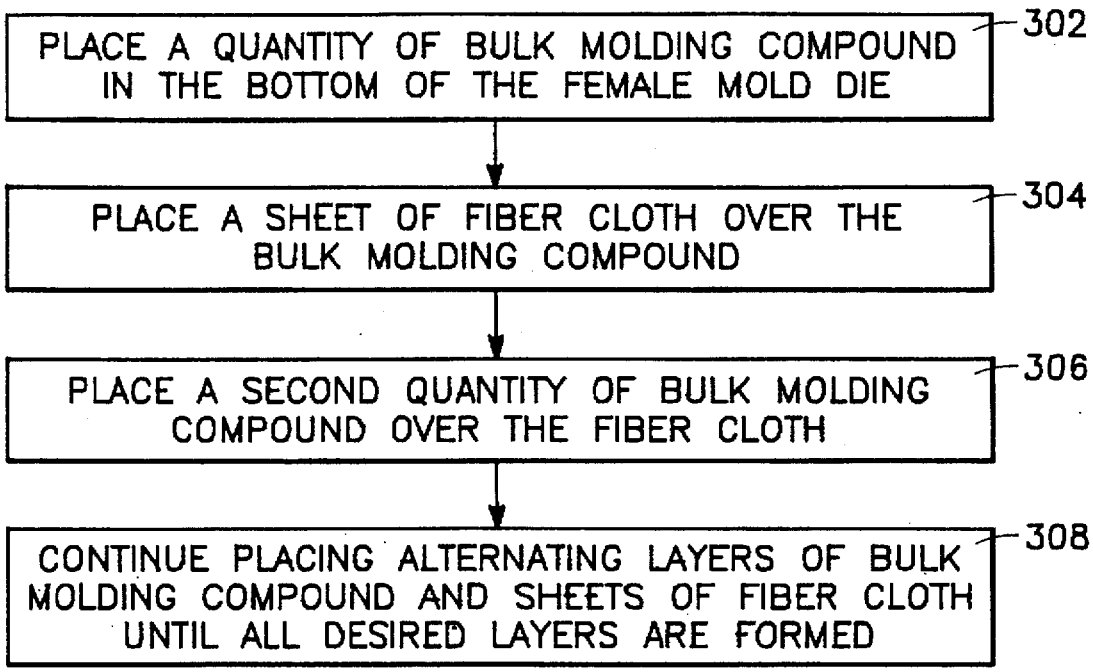
FIG. 5 is a block diagram of a method for the compression molding of FRCMC parts in accordance with the present invention wherein the molded part has a heterogeneous structure.

The compression and injection molding processes of the present invention described so far, will produce a FRCMC part which has a homogeneous structure. In other words the percentages of resin, fiber and filler (if present) will be substantially the same throughout the molded part. However, this need not be the case. Some applications may call for a heterogeneous structure where the types and percentages of the components making up the matrix vary form section to section in order to impart a varying set of characteristics. This could be accomplished in a compression molding process by employing a layering process. An example of this layering process is illustrated in FIG. 5, where a quantity of pre-mixed bulk molding compound is placed in the bottom of a female mold die (step 302). On top of this layer of molding compound is placed a sheet of fiber cloth, i.e. a sheet of material constructed of long woven fibers (step 304). Next, in step 306, another quantity of bulk molding compound is placed on top of the fiber cloth. This process is repeated until all the desired layers are formed (step 308). Each layer of bulk molding compound should include approximately the percentage of fiber and filler volume desired for that layer. The male die is lowered and the mold compressed to form the part, as discussed earlier. The layers of bulk molding compound are compressed, and the resin flows into the sheets of fiber cloth, and the excess resin is ejected from the mold through the resin outlet ports. If the fiber cloth is relatively dense (as it typically would be to maximize ductility and strength of the cloth layer), then the fibers and filler materials present in the bulk molding compound in a adjacent layer will not readily flow into the cloth. Thus, not only will the difference in fibers vary the characteristics exhibited by each layer, but the filler materials present in the layers formed from the bulk molding compound will also add to this variation in characteristics. Theoretically, each layer in the finished part could vary in its characteristics owing to differing fiber types and lengths, and differing fillers and filler quantities. However, the structure itself will be integrated because the ceramic matrix produced from the pre-ceramic resin will be constant throughout and so tie each layer together. It is noted that although the resin will flow into a dense fiber cloth, the path of least resistance to the resin flow may be through the outlet ports. Accordingly, it is preferred that the fiber cloth be pre-saturated with pre-ceramic resin prior to being placed in the mold to ensure there are no voids in the finished part which could weaken its structure.

The end result of the layering process would be an integrated multi-layer FRCMC structure where each layer could potentially exhibit different characteristics (i.e. mechanical, electrical, etc.). Such a FRCMC part can exhibit an overall characteristic not possible using a homogeneous structure. For example, relatively short, hard fibers could be employed in the bulk molding compound placed on either side of a thick sheet of fiber cloth made of softer, longer fibers. This would result in a part that has hard, rigid external faces, while still exhibiting a certain degree of ductility and strength owing to the fiber cloth comprising the center of the part.

Figure 6:
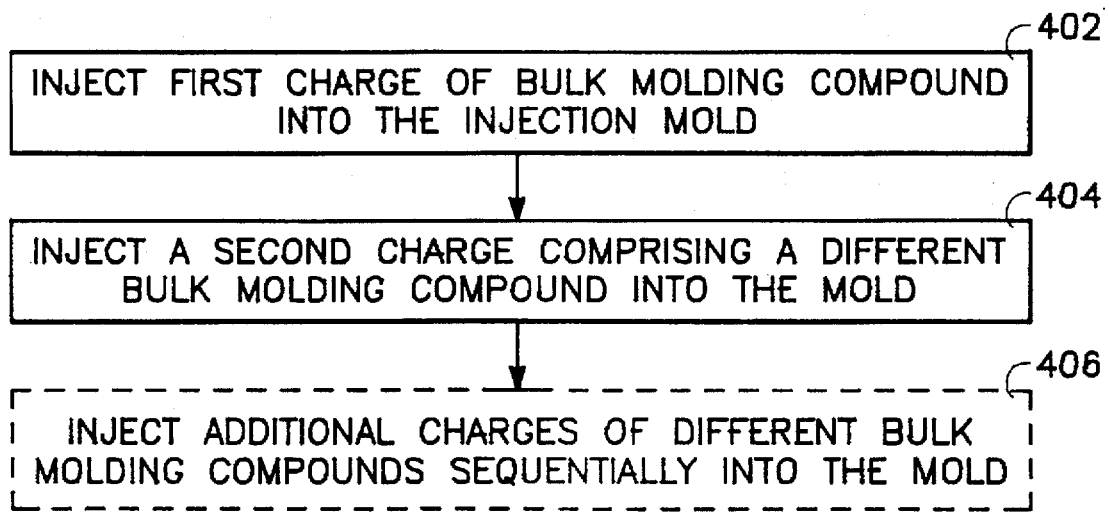
FIG. 6 is a block diagram of a method for the injection molding of FRCMC parts in accordance with the present invention wherein the molded part has a heterogeneous structure.

The creation of a heterogeneous structure in an FRCMC part is also possible when using an injection molding process. This can have significant advantages in the production of some parts. For example, the piston referred to previously, would advantageously have an extremely hard top surface so as to withstand the forced imposed on it within an internal combustion engine. However, the sides of the piston would benefit from a low coefficient of friction which would facilitate its sliding within a cylinder of an engine. This could be accomplished by molding the piston so that the fibers and/or filler materials present in the top of the part impart the desired hardness, while employing different fibers and/or filler materials which impart a degree of slipperiness in the portion of the piston forming the side walls. Heterogeneous injection molded part structures such as the one just described can be achieved by using multiple charges or partial charges of bulk molding compound. Specifically, a portion of the part being molded which is closer to the resin outlet ports (hereinafter referred to as the first portion) can be made to exhibit different characteristics than an adjacent portion further away from the ports (hereinafter referred to as the second portion). This is accomplished, as illustrated in FIG. 6, by first injecting bulk molding compound having the types of fibers and filler materials which will produced the desired characteristics in the first portion of the part being molded (step 402). The charge employed preferably contains the percentage of fiber and filler material which is desired to be present in the first portion plus at least enough resin to fill not only the remaining space in the first portion but also any remaining portion of the mold cavity and associated sprue channel (or sprue channels) behind the first portion. However, as will usually be the case, a considerable excess amount of resin will also be required to facilitate the movement of the fibers as discussed previously. This excess resin will flow out the resin outlet ports as in the other embodiments of the invention. Once the first charge has been completely injected into the mold, a substantial part of the fibers and filler materials present in the charge will probably be packed into the first portion. Next, in step 404, a second charge containing the quantities and types of fibers and filler materials desired to be present in the second portion of the molded part is injected into the mold. Here again, the second charge would also contain enough resin to fill the remaining space in the second portion once the fibers and filler material is packed therein, as well as enough to fill any remaining portion of the mold cavity and associated sprue channel(s) and any excess required to facilitate the flow of the fibers. The influx of the new bulk molding compound will push the remaining part of the first charge into the aforementioned first portion of the part, thereby packing the remaining fibers and filler materials (if any) and forcing the remaining excess resin of the first charge out of the resin outlet ports. Thereafter, the fibers and filler materials in the second charge will begin to pack into section of the mold corresponding to the aforementioned second portion of the part behind the packed fibers and filler materials associated with the first portion. If there are only two portions of the FRCMC part which are to exhibit different characteristics, the second charge will contain enough fibers and filler material (if any) necessary to finish packing the mold cavity. Once the molding is complete and the part pyrolyzed, and the portions formed by the present method will be integrated by the ceramic which will be present throughout the part. This heterogeneous structure injection molding process may be expanded to create any reasonable number of sections having different characteristics. This would be accomplished by repeating the above-described step associated with the second charge for additional charges (optional step 406).

Figure 7:
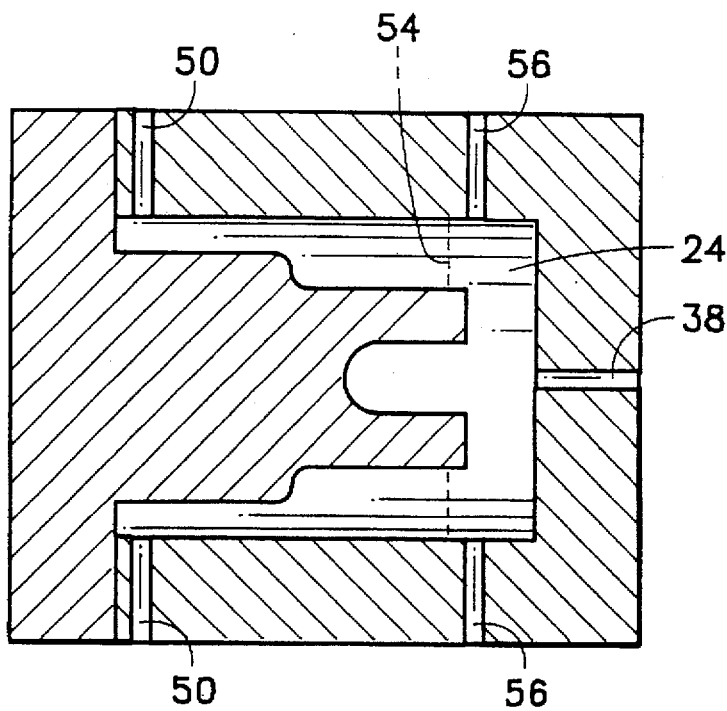
FIG. 7 is a cross-sectional view of an injection mold having multiple sets of resin outlet ports
Figure 8:
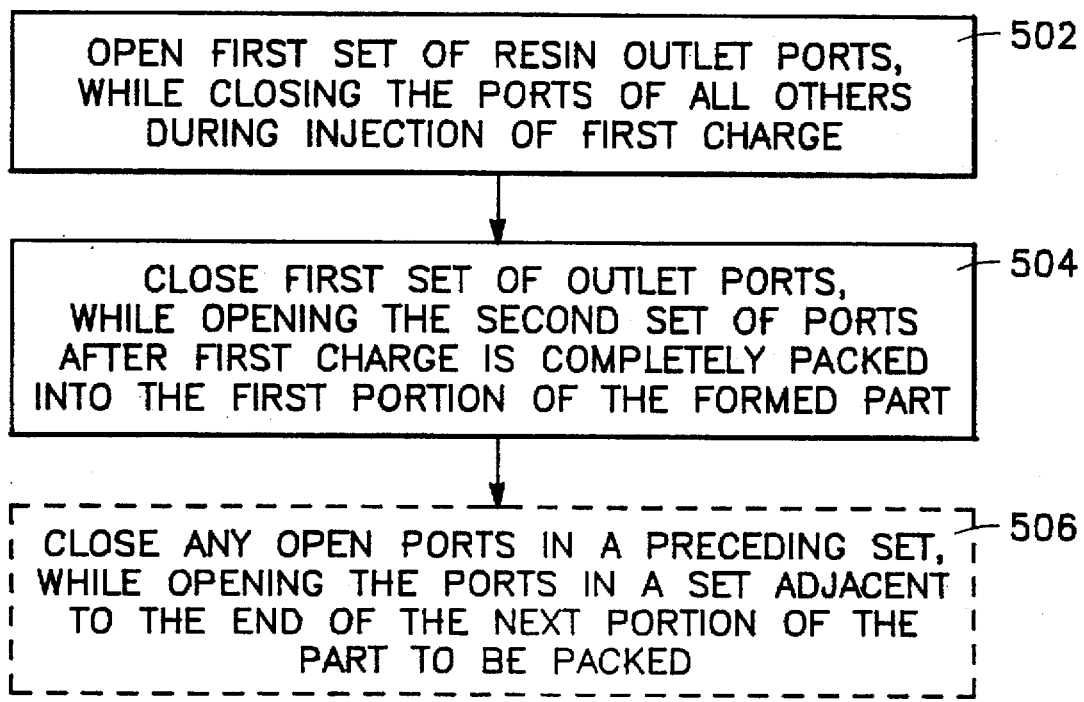
FIG. 8 is a block diagram of a "timed exit" method of injection molding in accordance with the present invention using a mold such as that of FIG. 7.

Due to the density of the packed fibers and filler materials in the first portion, relatively little of the fibers and filler materials from the second charge will infiltrated into the first portion. It is believed the only significant infiltration between the first and second portion will occur in a narrow boundary region between the two. However, this infiltration between sections can be minimized by employing a "timed exit" approach. Essentially, this approach entails opening and closing appropriately placed resin outlet ports to facilitate the injection molding of a heterogeneous structure in a FRCMC part. For example, as depicted in the mold for a piston shown in FIG. 7, a first set of resin outlet ports 50 would be disposed adjacent to the far end of the mold cavity 24 (i.e. furthest from the sprue channel 38). These ports 50 would be open during the part of the above-described injection process corresponding to the packing of fibers and filler materials into the first portion, as illustrated in step 502 in FIG. 8. This would include that part of the process where the second charge is used to push the remainder of the first charge into the first portion of the molded part. Once the second charge reaches the boundary between the first and second portions 54, as could be determined by monitoring the volume of resin ejected from the first outlet ports 50, the first ports 50 would be closed and a second set 56 of previously closed resin outlet ports opened (step 504). This second set of ports 56 is preferably disposed at the far end of the second portion adjacent the boundary 54 between first and second portions. The "timed exit" approach avoids having to force the resin associated with the second charge through the packed fibers and filler materials in the first portion of the part. This not only minimizes the infiltration of fibers and filler materials from the second charge into the first portion, but it also speeds up the molding process, as the resin from the second charge will flow more easily out of the second set of outlet ports. It is noted that an open set of ports need not be closed when opening the next set of ports. However, it is preferred that a preceding set of ports be closed so as to further minimize any infiltration that may take place if an alternate flow path through the preceding portion is left in place. It is also noted that additional sets of resin outlet ports (not shown in FIG. 7) can be added as required to coincide with the back end of each portion of the part that is to be created by a different charge. If such additional set of ports are included, they would be opened and closed in the same manner as the second set described above (optional step 506 of FIG. 8).

It is also noted that the "time exit" approach could be employed with the injection molding of homogeneous parts that are relatively long, i.e. where there is a considerable distance between the end of the sprue channel(s) and the furthermost reaches of the mold cavity. By incorporating at least a second set of resin outlet ports, for example at the midpoint of the mold cavity in relation to the sprue channel (s), the molding process can be expedited. The process would be essentially the same as that described for the injection molding of a heterogeneous structure, except that only one charge of bulk molding compound is involved, and the second set of ports would be opened once the fiber and filler had packed back to just forward of the second set of ports. If necessary, additional sets of outlet ports can be added to further expedite the injection molding of extremely long parts.

While the invention has been described in detail by reference to the preferred embodiment described above, it is understood that variations and modifications thereof may be made without departing from the true spirit and scope of the invention. For example, although the compression and injection molds described previously contained only one part-forming cavity, this need not be the case. A compression or injection mold as employed with the present invention could include multiple part-forming cavities.

Wherefore, what is claimed is:

1. A method of making a fiber reinforced ceramic matrix composite (FRCMC) part comprising the steps of:
    (a) injecting a quantity of bulk molding compound comprising a pre-ceramic resin and fibers into a mold having a cavity with walls which form the exterior surfaces of the FRCMC part being molded and at least one resin outlet port connecting the mold cavity to the exterior of the mold, wherein the quantity of said fibers injected corresponds to the maximum percent by volume of fibers capable of being packed within the mold cavity, and the quantity of pre-ceramic resin injected exceeds that necessary to fill the mold cavity in conjunction with the fibers and is sufficient to cause the fibers to flow with the resin and thereafter pack together within the mold cavity, and wherein excess resin exceeding that needed in conjunction with the fibers to fill the mold cavity, flows through the packed fibers and is expelled through the at least one resin outlet port;
    (b) heating the mold at a temperature and for a time associated with the pre-ceramic resin which polymerizes the resin remaining in the mold cavity to form a fiber-reinforced polymer composite structure;
    (c) removing the polymerized composite structure from the mold; and
    (d) heating the polymerized composite structure at a temperature and for a time associated with the polymerized resin which pyrolizes it to form a FRCMC structure.

2. The method of claim 1, wherein the viscosity of the pre-ceramic resin is chosen such that it is high enough to ensure the fibers flow therewith inside the cavity of the mold, but low enough to ensure the resin readily flows through the fibers once packed into position.

3. The method of claim 2, wherein the chosen viscosity of the pre-ceramic resin is greater for longer fibers.

4. The method of claim 3, wherein said fibers are approximately the same length, said fiber length being with a range of about 0.125 inch to 12 inches, and wherein the viscosity of the pre-ceramic resin is between 5000 and 30,000 centipoise.

5. The method of claim 1, wherein each resin outlet port has a cross-sectional area small enough to substantially ensure the fibers cannot flow through the port, yet large enough to allow the flow of resin therethrough.

6. The method of claim 1 wherein the bulk molding compound further comprises a quantity of filler material which corresponds to the percent by volume of filler material desired to be dispersed throughout the FRCMC part.

7. The method of claim 6, wherein the maximum percent by volume of fibers capable of being dispersed throughout the FRCMC part is between about 15 and 50 percent dependent on the length of the fibers employed, the shape of the part being molded, and the quantity of filler material.

8. The method of claim 1, further comprising the steps of:
    (e) after the completion of step (d), immersing the FRCMC part containing pores formed during step (d), into a bath of a pre-ceramic resin to fill the pores;
    (f) heating the FRCMC part at a temperature and for a time associated with the resin filling said pores so as to transform it to a ceramic material;

(g) repeating steps (e) and (f) until the pore density within the FRCMC part is less than a prescribed percentage by volume.

9. The method of claim 8, wherein the resin has a water-like viscosity.

10. The method of claim 8, wherein step (f) further comprises the step of placing the FRCMC part in a vacuum environment to facilitate the filling of the pores.

11. The method of claim 8, wherein the prescribed percentage by volume of the pore density of the FRCMC part is such that the part exhibits a repeatable strength.

12. The method of claim 1 wherein said at least one resin outlet port comprises a first outlet port set and said bulk molding compound is input into the cavity of the mold through at least one sprue channel, and wherein each outlet port of said first set is disposed at a location in the cavity of the mold which is as far away from each sprue channel as possible.

13. The method of claim 12 wherein said mold comprises additional resin outlet port sets each having at least one resin outlet port, each one of the additional port sets being disposed at a different location in the cavity of the mold between the first set of ports and the at least one sprue channel.

14. The method of claim 13 wherein each of said resin outlet port sets is capable of being opened so as to allow the flow of resin therethrough, or closed so as to prevent the flow of resin therethrough.

15. The method of claim 14 wherein step (a) of claim 1 further comprises the steps of:

initially closing all the resin outlet ports associated with every outlet port set with the exception of the first set wherein each of its ports is opened;

opening the resin outlet ports of a next set of outlet ports whenever said fiber has packed into the cavity of the mold from the locations of the first set of outlet ports to a point just adjacent to the next set of outlet ports.

16. The method of claim 15, further comprising the step of closing all open ports in other sets of resin outlet ports when opening the resin outlet ports of the next set of outlet ports.

17. A method of making a fiber reinforced ceramic matrix composite (FRCMC) part comprising the steps of:

(a) injecting a quantity of bulk molding compound comprising a pre-ceramic resin and fibers into a mold having a cavity with walls which form the exterior surfaces of the FRCMC part being molded and at least one resin outlet port connecting the cavity of the mold to the exterior of the mold, wherein the quantity of said fibers injected corresponds to the maximum percent by volume of fibers capable of being packed within a first portion of the the mold cavity and the quantity of pre-ceramic resin injected exceeds that necessary to fill the mold cavity in conjunction with the fibers and is sufficient to cause the fibers to flow with the resin and thereafter pack together within the first portion of the mold cavity, and wherein excess resin exceeding that needed in conjunction with the fibers to fill the mold cavity, flows through the packed fibers and is expelled through the at least one resin outlet port;

(b) sequentially injecting at least one additional quantity of bulk molding compound into the mold, wherein each additional quantity of bulk molding compound comprises an additional amount of the pre-ceramic resin and an additional amount of fibers, wherein the quantity of each additional amount of fibers injected corresponds to the maximum percent by volume of fibers capable of being packed within a respective additional portion of the mold cavity located adjacent a previous filled portion of the mold cavity, and wherein the quantity of each additional amount of pre-ceramic resin injected exceeds that necessary to fill the mold cavity in conjunction with the fibers and is sufficient to cause the associated additional amount of fibers to flow with the resin and thereafter pack together within the corresponding additional portion of the mold cavity, and wherein excess resin exceeding that needed in conjunction with all the fibers to fill the mold cavity, flows through the packed fibers and is expelled through the at least one resin outlet port;

(b) heating the mold at a temperature and for a time associated with the pre-ceramic resin which polymerizes the resin remaining in the mold cavity to form a fiber-reinforced polymer composite structure;

(c) removing the polymerized composite structure from the mold; and (d) heating the polymerized composite structure at a temperature and for a time associated with the polymerized resin which pyrolizes it to form a FRCMC structure.

18. The method of claim 17, wherein the viscosity of the pre-ceramic resin is chosen such that it is high enough to ensure the fibers flow therewith inside the cavity of the mold, but low enough to ensure the resin readily flows through the fibers once packed into position.

19. The method of claim 17, wherein each quantity of bulk molding compound further comprises a quantity of filler material which corresponds to the percent by volume of filler material desired within an associated portion of the FRCMC part.

20. The method of claim 17 wherein said at least one resin outlet port comprises a first outlet port set and each quantity of bulk molding compound is input into the cavity of the mold through at least one sprue channel, and wherein each outlet port of said first set is disposed at a location in the cavity of the mold which is as far away from each sprue channel as possible.

21. The method of claim 20 wherein said mold comprises additional resin outlet port sets each having at least one resin outlet port, each one of the additional port sets being disposed at a different location in the cavity of the mold between the first set of ports and the at least one sprue channel, said different locations corresponding to the end of one of said portions of the mold cavity furthest from the at least one sprue channel.

22. The method of claim 21 wherein each of said resin outlet port sets is capable of being opened so as to allow the flow of resin therethrough, or closed so as to prevent the flow of resin therethrough.

23. The method of claim 22 wherein step (a) of claim 17 further comprises the steps of:

initially closing all the resin outlet ports associated with every outlet port set with the exception of the first set wherein each of its ports is opened;

opening the resin outlet ports of a closed set of outlet ports whenever fiber has packed into the cavity of the mold from the locations of the first set of outlet ports to a point just adjacent to the closed set of outlet ports.

24. The method of claim 23, further comprising the step of closing all open ports in other sets of resin outlet ports when opening the resin outlet ports of the closed set of outlet ports.

* * * * *